(12) United States Patent
Kaplinsky et al.

(10) Patent No.: US 7,532,760 B2
(45) Date of Patent: May 12, 2009

(54) CMOS IMAGE SENSOR APPARATUS WITH ON-CHIP REAL-TIME PIPELINED JPEG COMPRESSION MODULE

(75) Inventors: Michael Kaplinsky, South Pasadena, CA (US); Igor Subbotin, South Pasadena, CA (US); Xiuhong Lin, Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 684 days.

(21) Appl. No.: 10/227,809

(22) Filed: Aug. 27, 2002

(65) Prior Publication Data
US 2004/0042668 A1     Mar. 4, 2004

(51) Int. Cl.
- *G06K 9/20* (2006.01)
- *G06K 9/28* (2006.01)
- *G06K 9/36* (2006.01)
- *G06K 9/46* (2006.01)
- *H04N 3/14* (2006.01)
- *H04N 5/335* (2006.01)

(52) U.S. Cl. .................. 382/232; 382/324; 348/294
(58) Field of Classification Search ........... 382/232, 382/233, 321, 324; 348/294; 365/189.01; 710/36
See application file for complete search history.

(56) References Cited

U.S. PATENT DOCUMENTS

| | | | | |
|---|---|---|---|---|
| 4,237,494 A * | 12/1980 | Yamaguchi | ........... | 358/474 |
| 4,833,651 A * | 5/1989 | Seltzer et al. | ........... | 365/189.07 |
| 5,084,841 A * | 1/1992 | Williams et al. | ........... | 365/189.07 |
| 5,165,103 A * | 11/1992 | Takeda et al. | ........... | 382/305 |
| 5,298,997 A * | 3/1994 | Manabe | ........... | 348/441 |
| 5,300,724 A * | 4/1994 | Medovich | ........... | 84/604 |
| 5,307,458 A * | 4/1994 | Freiburg et al. | ........... | 345/503 |
| 5,390,350 A * | 2/1995 | Chung et al. | ........... | 713/322 |
| 5,406,554 A * | 4/1995 | Parry | ........... | 370/381 |
| 5,434,593 A * | 7/1995 | Lecklider et al. | ........... | 345/634 |
| 5,450,599 A * | 9/1995 | Horvath et al. | ........... | 382/233 |
| 5,471,515 A | 11/1995 | Fossum et al. | | |
| 5,649,083 A * | 7/1997 | Barkans et al. | ........... | 345/597 |
| 5,659,362 A * | 8/1997 | Kovac et al. | ........... | 348/384.1 |
| 5,668,648 A * | 9/1997 | Saito et al. | ........... | 359/9 |
| 5,671,440 A * | 9/1997 | Curry | ........... | 345/656 |
| 5,708,263 A | 1/1998 | Wong | | |
| 5,774,754 A * | 6/1998 | Ootsuka | ........... | 396/380 |
| 5,778,218 A * | 7/1998 | Gulick | ........... | 713/503 |
| 5,835,691 A * | 11/1998 | Matsunoshita | ........... | 358/1.17 |
| 5,903,261 A * | 5/1999 | Walsh et al. | ........... | 715/500.1 |
| 6,078,532 A * | 6/2000 | Rivers et al. | ........... | 365/194 |
| 6,192,492 B1 * | 2/2001 | Masiewicz et al. | ........... | 714/56 |
| 6,204,524 B1 | 3/2001 | Rhodes | | |
| 6,452,632 B1 * | 9/2002 | Umeda et al. | ........... | 348/294 |
| 6,701,390 B2 * | 3/2004 | Ehmann | ........... | 710/33 |
| 6,757,019 B1 * | 6/2004 | Hsieh et al. | ........... | 348/302 |
| 6,920,510 B2 * | 7/2005 | Chang et al. | ........... | 710/36 |
| 6,927,794 B2 * | 8/2005 | Kubo et al. | ........... | 348/231.8 |
| 2001/0040635 A1 | 11/2001 | Fossum et al. | | |
| 2003/0160883 A1 * | 8/2003 | Ariel et al. | ........... | 348/308 |

* cited by examiner

*Primary Examiner*—Yubin Hung
(74) *Attorney, Agent, or Firm*—Dickstein Shapiro LLP

(57) ABSTRACT

A CMOS imager in which a CMOS image sensor, a color image processing module and an image compression module are all provided on a single die. Both the color image processing module and the image compression module incorporate pipelined architectures to process the image data at a video rate in a massively parallel fashion.

23 Claims, 6 Drawing Sheets

CMOS IMAGE SENSOR APPARATUS WITH ON-CHIP REAL-TIME PIPELINED JPEG COMPRESSION MODULE

FIELD OF THE INVENTION

The invention relates generally to improved semiconductor imaging devices and, more specifically, to a CMOS imager provided with an on-chip data compression module.

BACKGROUND OF THE INVENTION

A number of different types of semiconductor-based imagers exist, including charge coupled devices (CCDs), CMOS arrays, photodiode arrays, charge injection devices and hybrid focal plane arrays. Recently, however, CMOS imagers have gained popularity in use in a wide variety of electronic devices, because CMOS imagers offer a number of advantages over other types of imagers. CMOS imagers, for example, are compatible with integrated on-chip electronics (control logic and timing, image processing, and signal conditioning such as A/D conversion). CMOS imagers allow random access to the image data. CMOS imagers have lower fabrication costs as compared with the conventional CCD imagers, since standard CMOS processing techniques can be used. Additionally, CMOS imagers have low power consumption because only one row of pixels at a time needs to be active during the readout and there is no charge transfer (and associated switching) from pixel to pixel during image acquisition. On-chip integration of electronics is particularly advantageous because of the potential to perform many signal conditioning functions in the digital domain (versus analog signal processing) as well as to achieve a reduction in system size and cost.

CMOS imagers as discussed above are generally known as discussed, for example, in Nixon et al., "256×256 CMOS Active Pixel Sensor Camera-on-a-Chip," IEEE Journal of Solid-State Circuits, Vol. 31(12) pp. 2046-2050, 1996; Mendis et al, "CMOS Active Pixel Image Sensors," IEEE Transactions on Electron Devices, Vol. 41(3) pp. 452-453, 1994 as well as U.S. Pat. Nos. 5,708,263, 5,471,515, and 6,204,524, which are herein incorporated by reference.

Recent advances in CMOS image sensor technology include the integration of the imager and sophisticated image processing modules on a single die, as mentioned above. These systems-on-a-chip (SOCs) usually have cost, power consumption and form-factor advantages over the multi-chip solutions with the same functionality. Furthermore, image processing modules integrated with CMOS imagers can be fine tuned to the specific properties of the given imager and to the needs of the targeted applications. One segment of the market where the low power of CMOS imagers is most advantageous is the mobile devices market. Many cell-phone designs are incorporating image sensors in their architectures. However, bandwidth limitations imposed by wireless transmission, together with the desire to employ image sensors with large pixel counts, necessitates the use of image compression in the system. Many of the existing designs draw on the ability of the on-chip CPU to perform image compression, but at speeds far below video rates. Other available solutions rely on an additional image processing chip to perform color processing and compression.

All of the known solutions require a frame buffer memory to allow for rate conversion between video rate of incoming uncompressed data and the rate at which compression can be performed by either system or dedicated CPU. This leads to increased cost of the imager module and reduced video throughput of the system. Accordingly, it would be desirable to provide a CMOS imager with on-board image compression circuitry which processes image data in real time, and thus eliminates the need for a frame buffer memory.

SUMMARY OF THE INVENTION

The present invention provides a CMOS imager in which a CMOS image sensor, a color image processing module and an image compression module are all provided on a single die. Both the color image processing module and the image compression module incorporate pipelined architectures to process the image data at a video rate in a massively parallel fashion.

Additional advantages and features of the present invention will be apparent from the following detailed description and drawings, which illustrate preferred embodiments of the invention.

DETAILED DESCRIPTION OF THE PREFERRED EMBODIMENTS

In the following detailed description, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

Figure 1:
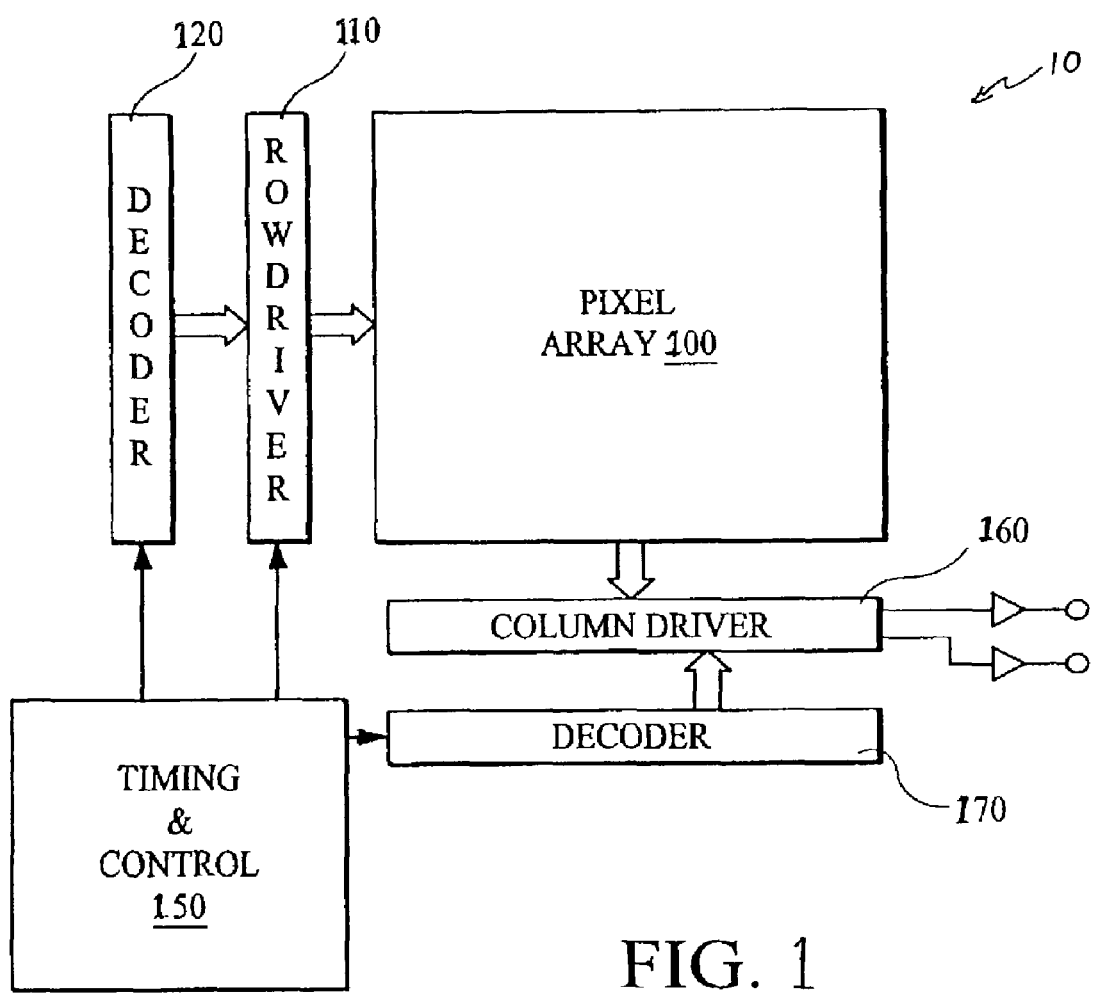
FIG. 1 is a block diagram of a typical CMOS pixel sensor chip.

FIG. 1 illustrates a block diagram for a typical CMOS imager 10 having a pixel array 100 with each pixel cell being constructed in the manner disclosed, for example, in U.S. Pat. No. 6,204,524, the disclosure of which is herein incorporated by reference. Pixel array 100 comprises a plurality of pixels arranged in a predetermined number of columns and rows. The pixels of each row in array 100 are all turned on at the same time by a row select line, and the pixels of each column are selectively output by a column select line. A plurality of rows and column lines are provided for the entire array 100. The row lines are selectively activated by the row driver 110 in response to row address decoder 120 and the column select lines are selectively activated by the column driver 160 in response to column address decoder 170. Thus, a row and column address is provided for each pixel. The CMOS imager is operated by the control circuit 150 which controls address decoders 120, 170 for selecting the appropriate row and column lines for pixel readout, and row and column driver circuitry 110, 160 which apply driving voltage to the drive transistors of the selected row and column lines.

In the operation of the FIG. 1 CMOS imager, one of the rows of pixels is selected for readout by using row driver 110 as described above. All pixels on a selected row are processed simultaneously and sampled onto a capacitor at the bottom of their respective columns. The column-parallel sampling process typically takes 1-10 mμ sec, and preferably occurs during the so-called horizontal blanking interval of a video image. Each column is then successively selected for read-out of the voltage stored in the capacitor of that column using column driver 160. The output data from CMOS imager 10 is then processed in accordance with the present invention as described below.

Figure 2:
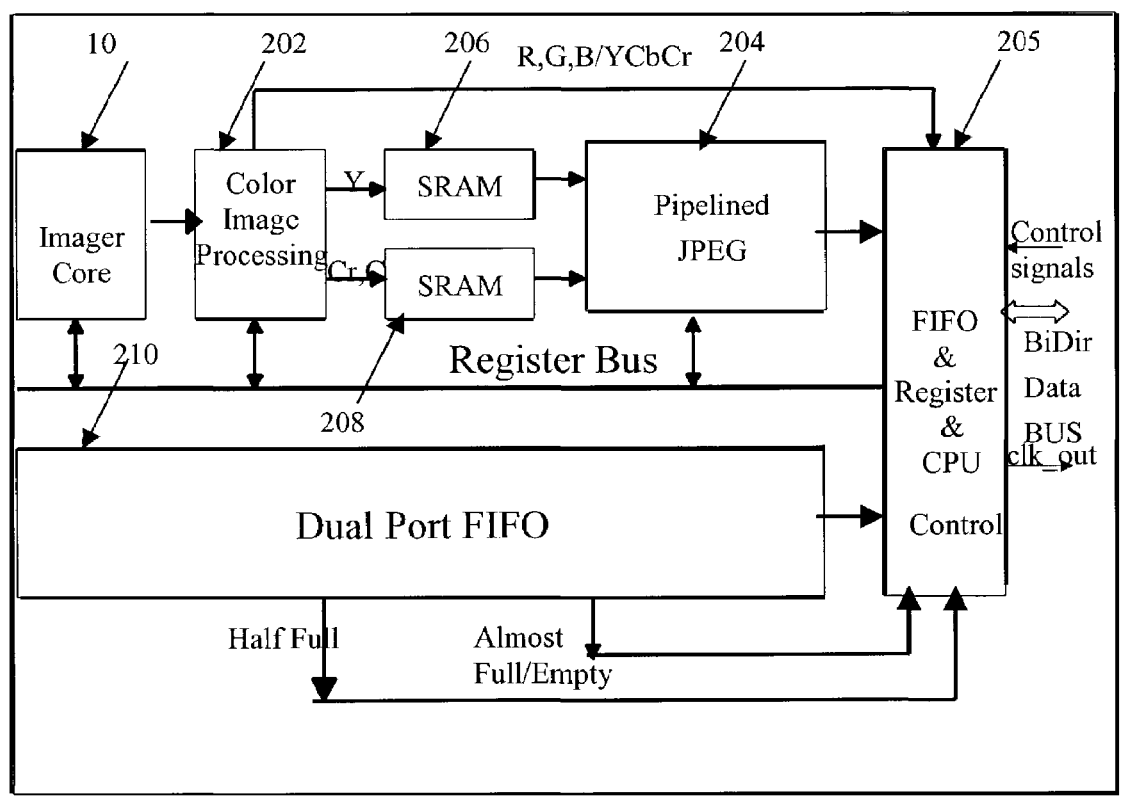
FIG. 2 is a block diagram of a preferred embodiment of the present invention.

With reference to the block diagram of FIG. 2, in a preferred embodiment of the present invention, color image processor 202 converts digitized imager data (output from CMOS imager 10 of FIG. 1) from its native format (such as RGB) into a format more suitable for image compression, such as YCrCb (according to ISO CCIR-601). Once the image data is converted into appropriate for compression format, the data stream is passed to highly pipelined compression module. In the preferred embodiment of the present invention, compression module 204 implements JPEG compression at the video rate. In this embodiment, there are a number of line buffers 206, 208 at the front end of the compression designed to allow two-dimensional processing. In the preferred embodiment of the present invention, JPEG compression module 204 implements baseline JPEG compression, as described below in more detail with reference to FIG. 3. FIFO & Register & CPU Control module 205 implements all of the interface control and communicates with each of the modules and the outside system data/memory bus.

Figure 3:
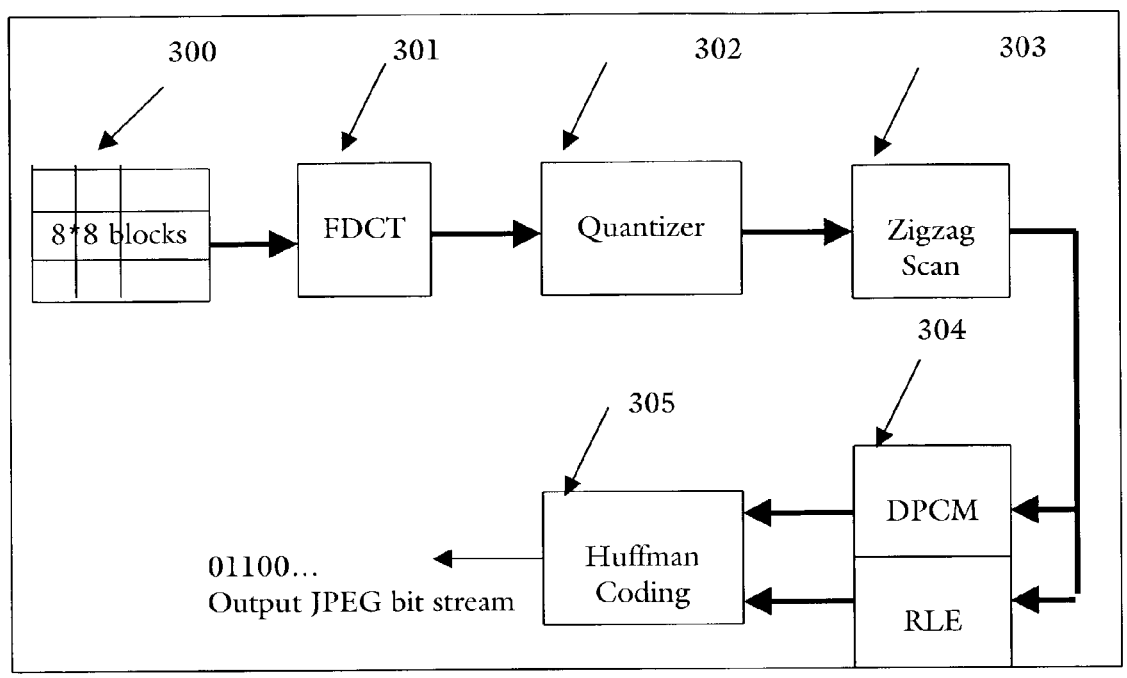
FIG. 3 is a block diagram of the baseline JPEG compression module of the present invention.

FIG. 3 provides a more detailed block of baseline JPEG compression module 204. The circuitry is arranged in such a way as to pass the data from one stage to the next, allowing the entire compression operation to be performed at the video pixel rate. JPEG compression module 204 divides up the image into 8 by 8 pixel blocks in module 300, and then calculates the fast discrete cosine transform (FDCT) of each block in module 301. Quantizer module 302 rounds off the FDCT coefficients according to a specified quantization matrix. This step produces the "lossy" nature of JPEG, but allows for large compression ratios. Zigzag module 303 then performs variable length coding on these coefficients, followed by Huffman coding in module 305, which then outputs the compressed binary bitstream. For decompression, JPEG recovers the quantized DCT coefficients from the compressed data stream, takes the inverse transforms and displays the image.

The present invention utilizes a unique SRAM addressing scheme to reduce the memory area and improve the utilization rate of memory to maximum. Referring back to FIG. 2, the output from Color Image Processing module 202 is continually written to the corresponding SRAM 206, 208 line by line. Since JPEG compression module 204 works on 8*8 blocks of data, 8 lines of data have to be ready before compression. The challenge is how to read and write to the SRAM at the same time. There are two addressing schemes to address this problem. The first scheme uses a "ping-pong" algorithm, which uses two SRAMs, one to store the data from Color Image Processing module, and the other for JPEG compression. This scheme switches SRAM banks after every interval of 8 lines of data. The second scheme uses only one SRAM. The JPEG compression module 204 begins to read after 8 lines of data have been written to the SRAM 206, 208. Then, the output from Color Image Processing module 202 is written to the location in the SRAM from where the data has just been read. Compared with the ping-pong scheme, the latter scheme uses only one-half of the amount of SRAM. In the present invention, the second scheme is utilized, thereby greatly reducing the chip area.

Figure 4:
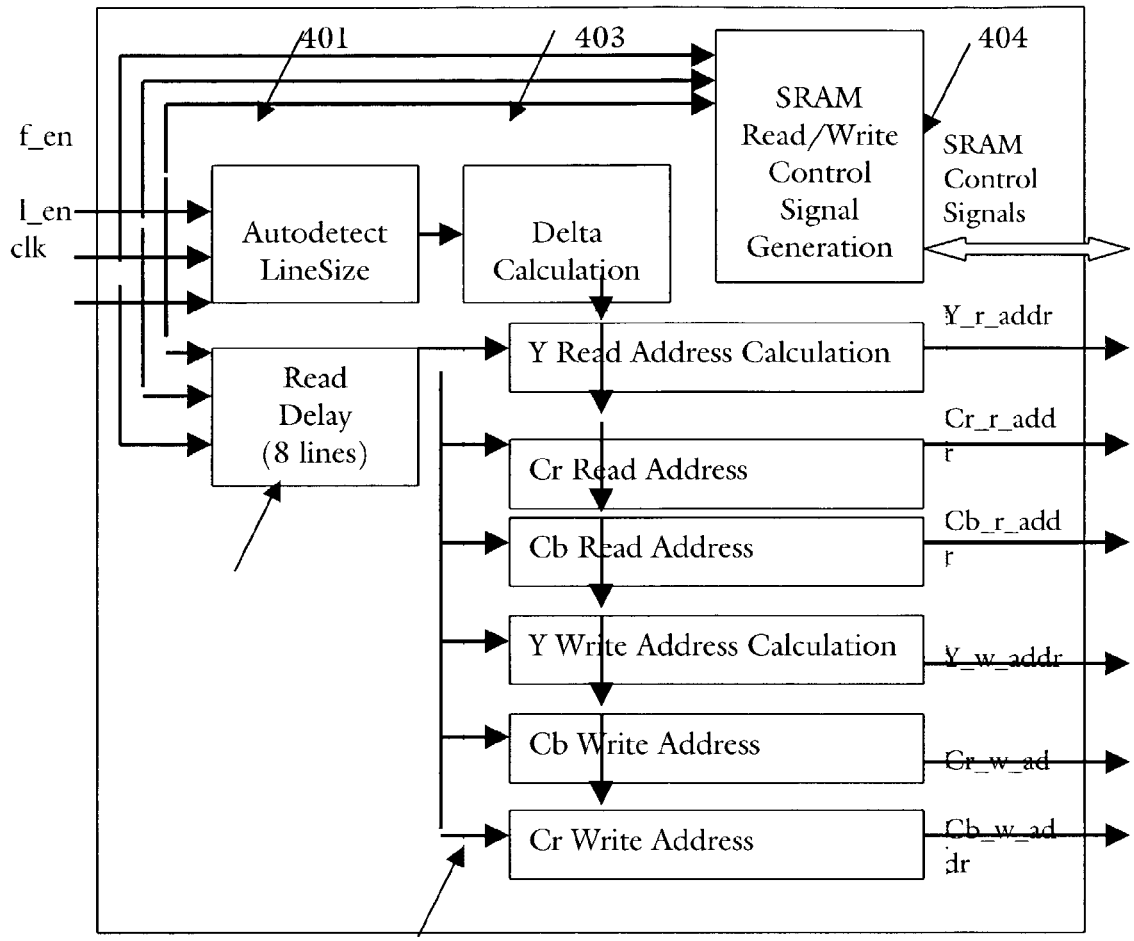
FIG. 4 is a block diagram of the SRAM Addressing Scheme of the present invention.

With reference to the block diagram of FIG. 4, the detail of the SRAM addressing is shown. To reduce the chip area, the SRAM uses the minimum size to hold 8 lines of image data for JPEG compression. Module 401 automatically detects the video size and self-adjusts the addressing scheme. Module 402 delays reading for eight lines so that full 8 lines of data are ready for JPEG processing. Module 404 extracts two dimensional data from the linear SRAM, separates Y, Cb and Cr to reconstruct 8*8 blocks, and outputs the data in block order of Y Y Cb Cr, while new video data is simultaneously written to the SRAM. In each block, the data is output line by line. To provide real time video, the calculation of read and write addresses is performed "on-the-fly" without overwriting video data. All addresses including Y read address, Cr read address, Cb read address, Y write address, Cr write address, and Cb write address are calculated, pixel by pixel, which adds to the complexity of the scheme. The following formulas are used for all address calculations. The coefficients are adjusted every 8 lines. LineSize denotes the number of columns in the video frame.

$$\text{Address\_next} = \text{Clip} (\text{Address\_current} + \text{Delta\_current})$$

$$\text{Delta\_next} = \text{Delta\_current} * (\text{LineSize}/8) - (\text{LineSize} - 1) * [\text{Delta\_current} * (\text{LineSize}/8) / (\text{LineSize} - 1)]$$

$$\text{Clip}(A) = A - \text{LineSize} - 1 \quad \text{when } A > (\text{LineSize} - 1)$$
$$= 2 * (\text{LineSize} - 1) \quad \text{when } A > 2 * (\text{LineSize} - 1)$$

Due to the nature of JPEG encoding, the output data rate of the encoder is variable (intermittent). This might present a problem for the overall system architecture, as in the absence of the frame buffer there would be a need to constantly monitor the availability of the compressed data for transfer to the system memory or direct transmission to the remote site. This type of system behavior would unnecessarily tie-up system resources (such as CPU cycles and data bus bandwidth). In order to address this problem, the present invention incorporates a relatively small memory buffer, FIFO 210, at the output of the encoder. This buffer, being much smaller that a full frame buffer, preserves the cost advantages of the system and allows for periods of fixed-rate data output interspersed with periods of inactivity.

In the preferred embodiment of the present invention, output buffer 210 is a dual-ported memory together with pointer control block, allowing the buffer to function as a FIFO (first-in-first-out). In this embodiment, the pointer control block allows for storage of the output of the encoder as soon as it becomes available, while allowing independent retrieval of the data based on the external requests, as long as FIFO is not empty. In yet another embodiment of this invention, the FIFO control block generates Half-Full and/or Almost Empty/Over X bytes flags describing the state of the content of the FIFO. These signals can then be used as an interrupt for external controller, prompting data retrieval cycle and relieving the external controller from the need to constantly monitor data availability in the FIFO.

Figure 5:
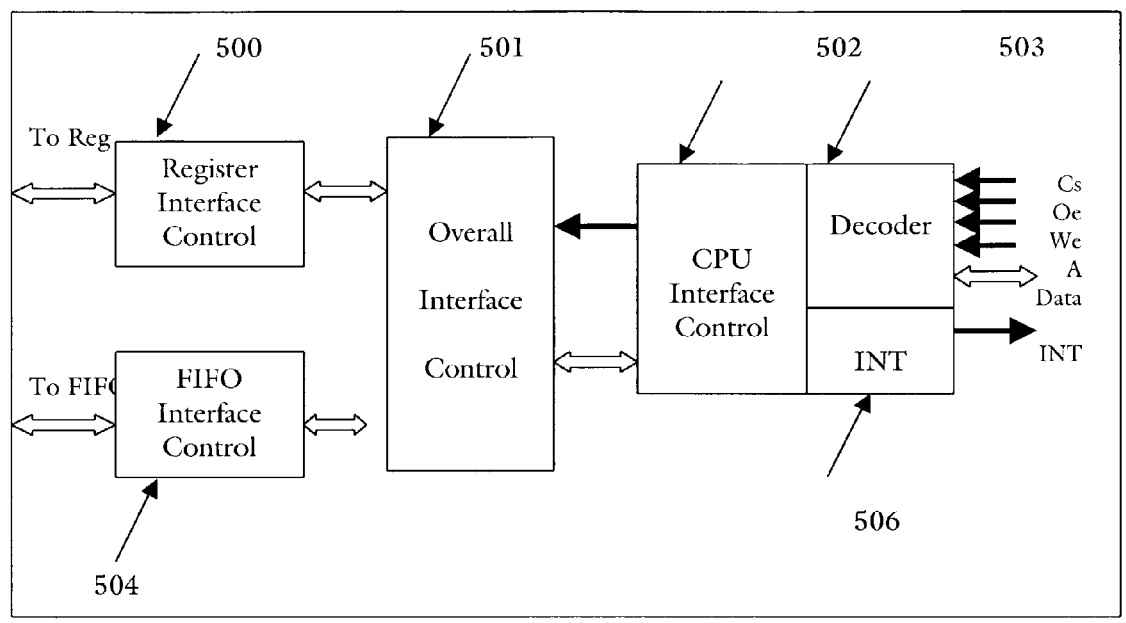
FIG. 5 is a block diagram of the FIFO & Register Control module of the present invention.

Fig. 5 shows a more detailed block diagram of the FIFO & Register & CPU Control module, which implements the communication with the other modules. CPU Interface Control Module 502 communicates with the system data/memory bus through control signals and bi-directional data bus for various operations, such as register read/write, FIFO data read, FIFO current usage, INT status, etc. Decoder module 503 handles control signal decoding. Module 506 generates an INT signal according to the current FIFO status. Reading or writing to a specified register via the Register Bus (FIG. 2) is coordinated through Register Interface Control module 500. FIFO Interface Control module 504 controls the reading process from FIFO. All interfaces are controlled and synchronized by Overall Interface Control module 501.

In the preferred embodiment of the present invention, the INT signal is supplied to access the internal FIFO over the system data/memory bus. To read video data correctly from the internal FIFO, the CPU must know the current state of FIFO. The following FIFO conditions will generate the INT signal transition and will also be reflected as the corresponding INT status register bits. The CPU inquiries the INT status register to get the current FIFO states. Based on the FIFO status, the CPU initiates or stops the video data read process or processes the data.

| | |
|---|---|
| Bit 0: | End of video frame is in FIFO |
| Bit 1: | FIFO overflow |
| Bit 2: | FIFO empty |
| Bit 3: | End of Frame is read from FIFO |
| Bit 4: | X bytes in FIFO where X is programmable |

In a preferred embodiment of the present invention, the FIFO outputs are connected directly to the system data/memory bus, allowing for the access to the imager system to be performed over standard system communication channel in a way similar to the memory access. In yet another embodiment of the invention, the access to the registers/control functions of the imager system itself is also performed through the same bus interface. In this embodiment, the control signals are provided to allow distinguishing between various traffic over the output pins: image access, register write and register read access.

In addition to providing real-time compressed data stream, the imager system of the present invention may also need to provide uncompressed video stream either in full frame format or in decimated format (such as VGA image decimated to CIF resolution). Accordingly, in another embodiment of the present invention, the encoder output (compressed data stream) and the uncompressed video can be multiplexed to the input port of the output memory buffer (FIFO).

Figure 6:
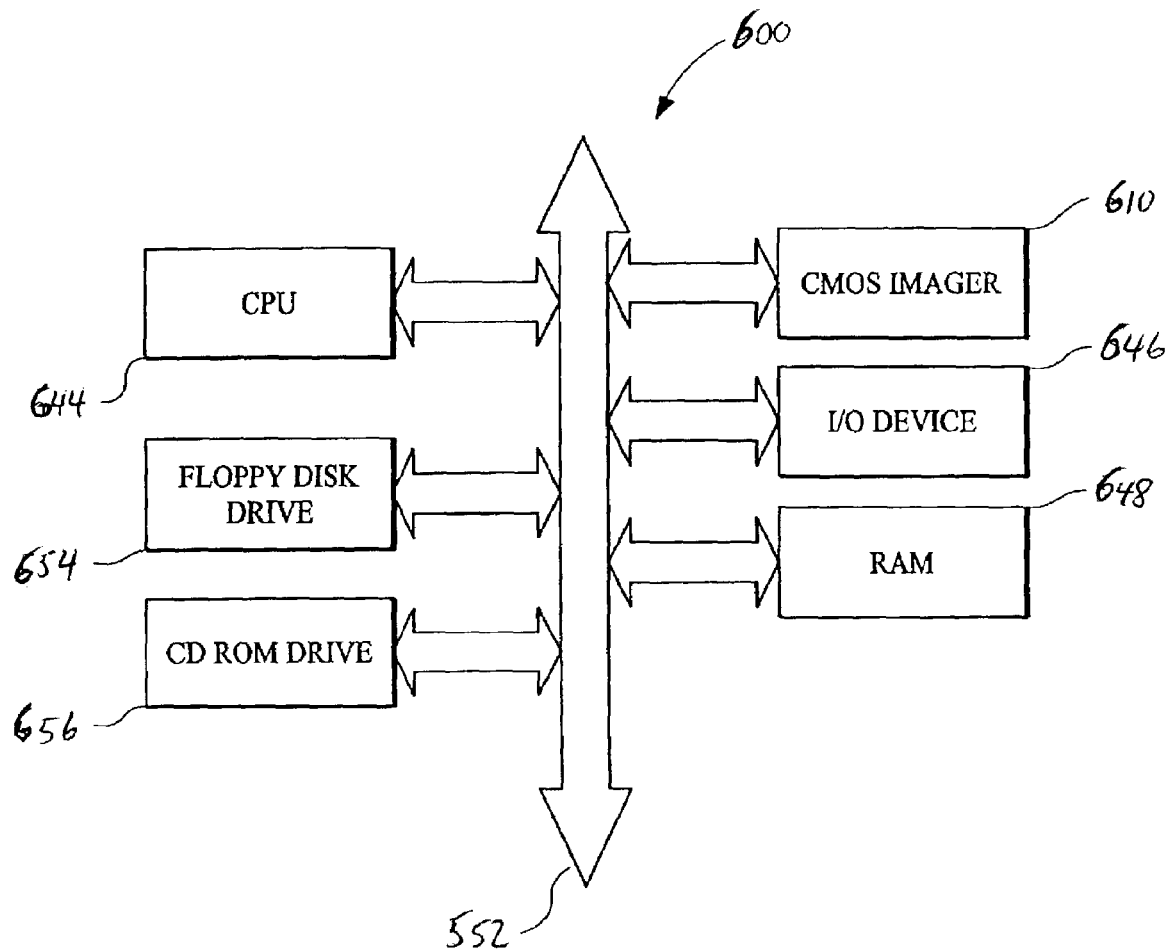
FIG. 6 is an illustration of a computer system having a CMOS imager according to the present invention.

A typical processor based system that includes a CMOS imager device according to the present invention is illustrated generally at 600 in FIG. 6. A processor based system is exemplary of a system having digital circuits which could include CMOS imager devices. Without being limiting, such a system could include a computer system, camera system, scanner, machine vision system, vehicle navigation system, video telephone, surveillance system, auto focus system, star tracker system, motion detection system, image stabilization system and data compression system for high-definition television, all of which can utilize the present invention.

A processor system, such as a computer system, for example generally comprises a central processing unit (CPU) 644 that communicates with an input/output (I/O) device 646 over a bus 652. The CMOS imager 610 also communicates with the system over bus 652. The computer system 600 also includes random access memory (RAM) 648, and, in the case of a computer system may include peripheral devices such as a floppy disk drive 654 and a compact disk (CD) ROM drive 656 which also communicate with CPU 644 over the bus 652.

As described above, CMOS imager 610 is combined with a pipelined JPEG compression module in a single integrated circuit.

The above description and drawings illustrate a preferred embodiment which achieves the objects, features and advantages of the present invention. It is not intended that the present invention be limited to the illustrated embodiments. Any modification of the present invention which comes within the spirit and scope of the following claims should be considered part of the present invention.

What is claimed as new and desired to be protected by Letters Patent of the United States is:

1. A CMOS imaging device comprising:
a single integrated circuit chip comprising:
a CMOS image sensor;
a color image processing module;
an image storage module coupled to said color image processing module; and
an image compression module coupled to said image storage module, wherein:
said image storage module is configured to store color video image data from said color image processing module,
said image storage module is further configured to transfer a plurality of color components of said color video image data in parallel to said image compression module,
said color video image data is stored in locations in which color video image data was recently transferred out,
said image storage module is further configured to use a memory addressing scheme other than a ping-pong memory addressing scheme, and
wherein said image compression module has a pipelined architecture for processing image data in a parallel fashion at video rates without requiring a full frame memory buffer.

2. The CMOS imaging device of claim 1, wherein said image compression module implements JPEG compression at video rates.

3. The CMOS imaging device of claim 2, wherein said image storage module comprises a plurality of line buffers at a front end of the compression module to allow two-dimensional processing.

4. The CMOS imaging device of claim 2, wherein said JPEG image compression module implements baseline JPEG and contains one or more of a DCT module, a Zig-Zag scan module, a quantization module and an entropy encoder module.

5. The CMOS imaging device of claim 2, further comprising a buffer at the output of the image compression module to allow for periods of fixed-rate data output interspersed with periods of inactivity.

6. The CMOS imager device of claim 5, wherein the output buffer is a dual-ported memory provided with a pointer control block, such that the buffer functions as a FIFO memory.

7. The CMOS imager device of claim 6, wherein the pointer control block allows for the storage of the output of the image compression module as soon as it becomes available, while allowing independent retrieval of data based on external requests.

8. The CMOS imager device of claim 6, further comprising a FIFO & Register & CPU control block to enable register access and FIFO access via a single system data/memory bus.

9. The CMOS imager device of claim 8, wherein the FIFO & Register & CPU control block generates an INT signal reflecting the current state of the FIFO.

10. The CMOS imager device of claim 8, wherein control signals are provided to distinguish between image access, register write, and register read traffic over the output pins.

11. The CMOS imager device of claim 6, wherein the FIFO pointer control block generates fill level flags reflecting the fill level of the FIFO memory.

12. The CMOS imager device of claim 6, wherein the FIFO outputs are connected directly to a data/memory bus of a system, allowing for access to the system to be performed over standard system communication channels.

13. The CMOS imager device of claim 12, wherein access to registers and control functions of the imager system is also performed over said data/memory bus.

14. The CMOS imager device of claim 6, further comprising circuitry for multiplexing compressed and uncompressed video to an input port of the FIFO memory.

15. The CMOS imaging device of claim 1, wherein said color imaging processing module converts digitized imager data from first format which is native to a CMOS imager to a second format suitable for image compression.

16. The CMOS imaging device of claim 15 wherein said first format is RGB and said second format is YCrCb.

17. A CMOS imaging device comprising:
a single integrated circuit chip comprising:
   a CMOS image sensor;
   a color image processing module;
   an image storage module coupled to said color image processing module; and
   an image compression module coupled to said image storage module,
   wherein:
      said image storage module is configured to store color video image data from said color image processing module,
      said image storage module is further configured to transfer a plurality of color components of said color video image data in parallel to said image compression module,
      said color video image data is stored in locations in which color video image data was recently transferred out,
      said image storage module is further configured to use a memory addressing scheme other than a ping-pong memory addressing scheme,
      said image storage module uses an SRAM addressing scheme to allow maximum utilization rate of memory, comprising reading and writing to one SRAM at the same rate without overwriting, and
      an address calculation formula is used in SRAM addressing, the address calculation formula comprising:

Address_next=Clip (Address_current +Delta_current);

Delta_next =Delta_current * (LineSize /8)−(LineSize−1) *

[Delta_current * (LineSize/8)/ (LineSize−1)];

$$Clip(A) = A - LineSize - 1 \quad \text{when } A > (LineSize - 1)$$
$$= 2 * (LineSize - 1) \quad \text{when } A > 2 * (LineSize - 1),$$

where LineSize is a number of columns in the video frame, Address_next is a next address to be calculated, Address_current is a current address being calculated, Delta_next is a change in the next address calculation, and Delta_current is a change in the current address calculation.

18. A process for processing image data from a CMOS imager device, comprising the steps of:
   converting an image to video image data using a CMOS image sensor;
   color image processing said video image data from a first format which is native to a CMOS imager to a second format more suitable for image compression;
   storing said processed video image data in a memory; and
   compressing said stored video image data using a processing module having a pipelined architecture for processing image data in a parallel fashion at video rates without requiring a full frame memory buffer,
   wherein:
      said converting, color image processing, storing, and compressing steps are performed on a single chip,
      said memory is further configured to transfer a plurality of components of said stored processed video image data in parallel to said processing module,
      said processed video image data is stored in locations in which said stored processed video image data was recently transferred out,
      said memory is further configured to use a memory addressing scheme other than a ping-pang memory addressing scheme.

19. The process of claim 18, wherein said step of compressing the image comprises JPEG compression at video rates.

20. The process of claim 19, wherein said step of storing said processed image data in a memory comprises using an SRAM addressing scheme to allow maximum utilization rate of memory, said SRAM addressing scheme comprising reading and writing to one SRAM at the same rate without overwriting.

21. The process of claim 18, wherein said step of color image processing comprises converting digitized imager data from first format which is native to a CMOS imager to a second format more suitable for image compression.

22. The process of claim 18, wherein said first format is RGB and said second format is YCrCb.

23. A processing system, comprising:
   a processor for receiving and processing video image data; and
   an image data generator for supplying video image data to the processor, the image data generator comprising:
      a single chip comprising:
         a CMOS image sensor;
         a color image processing module;
         an image storage module coupled to said color image processing module; and
         an image compression module coupled to said image storage module,
         wherein:
            said image storage module is configured to store color video image data from said color image processing module,
            said image storage module is further configured to transfer a plurality of color components of said color video image data in parallel to said image compression module,
            said color video image data is stored in locations in which color image data was recently transferred out, said image storage module is further configured to use a memory addressing scheme other than a ping-pong memory addressing scheme, and wherein said image compression module has a pipelined architecture for processing image data in a parallel fashion at video rates without requiring a full frame memory buffer.

* * * * *